(No Model.)

T. I. SMITH.
BRACELET.

No. 342,396. Patented May 25, 1886.

Attest
Walter Donaldson
F. L. Middleton

Inventor
Theron I. Smith
by Joyce & Spear
Attys.

UNITED STATES PATENT OFFICE.

THERON I. SMITH, OF NORTH ATTLEBOROUGH, MASSACHUSETTS.

BRACELET.

SPECIFICATION forming part of Letters Patent No. 342,396, dated May 25, 1886.

Application filed December 7, 1885. Serial No. 184,977. (No model.)

*To all whom it may concern:*

Be it known that I, THERON I. SMITH, of North Attleborough, in the county of Bristol and State of Massachusetts, have invented a new and useful Improvement in Bracelets; and I do hereby declare that the following is a full, clear, and exact description of the same.

My invention relates to bracelets of that class in which two wings are employed pivoted to each other, so as to open, and combined with a spring which tends to close the bracelet and hold it in a closed position.

The invention, which concerns mainly the spring and its connection with the wings, is designed to secure neatness of finish and appearance and to cheapen the manufacture.

Figure 1:
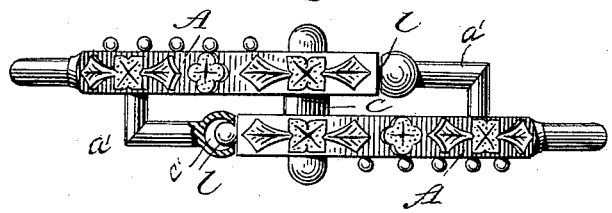
Figure 2:
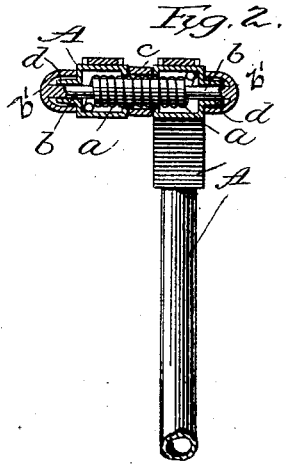
Figure 3:
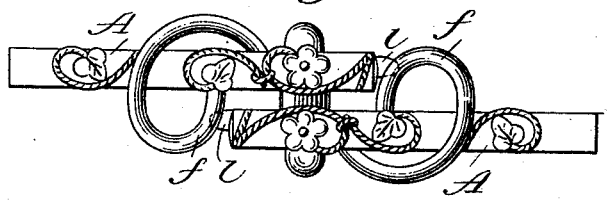

In the accompanying drawings, Figure 1 shows a plan view of my invention. Fig. 2 shows a section on line $x$ $x$ of Fig. 1. Fig. 3 is a plan view of modification of ornamentation.

The wings of the bracelets are shown at A A, and at their pivoted ends overlap each other. These pivoted ends are enlarged and preferably rectangular in cross-section, and form the main part of the central ornament of the bracelet. They are pivoted to each other, as has before this been done, by a transverse pin passing through and operating with a spring. In order to apply the spring to this old construction, I bore the inner wall of the wings at the pivotal point large enough to receive the spring, and the outer wall has a perforation only large enough for the pivoting-pin. The spring $a$ is coiled, and the ends of the coil are passed through the holes in the inner wall of each overlapping wing and bear against the outer wall in line with the pin-hole therein. At each end of the coil the end of the wire is left projecting tangentially to the coils, and these ends, bearing upon the inner surfaces of the wings, (which are hollow,) form bearings for the springs. The pin $b$ is pressed through the wings and axial center of the spring, and holds all the parts together.

To prevent the wings from chafing and to give a better appearance, a properly-finished section of ring, $c$, is interposed between the wings and placed over the coiled spring, thus concealing it entirely from view.

To give suitable bearings for the pivoting-pin, tubular bosses $d$ are furnished, to extend the pin bearing formed by the hole in the wall. The pins are provided with suitable hollow heads, $b'$ $b'$, to cover these bosses.

The wings may be ornamented in any desired way, and the ornamentation may be utilized, as shown, to form stops for the wings when closed. In Fig. 1 an arm, $a'$, is fixed to the side of one wing and bent at right angles to bring the projecting end into line with the other wing and near its pivoted end. The end of the arm has a concave head, $c'$, against the under concave side of which a stud or projection, $l$, fixed to the end of the wing, rests when the wing is closed, and thus the movement of the wing is limited.

The ornament may be applied as in Fig. 3, in which the bend $f$ of an ornamental arm branch forms the stop against which the projection $l$ rests when the wings are closed. These stops also serve to give symmetry to the ornamental center of the bracelet.

The wings may be, as in Fig. 3, of full size throughout, or may be reduced at a short distance from the pivot, for lightness, to a smaller size, either round or polygonal in cross section, as shown in Figs. 1 and 2.

I claim as my invention—

1. In a bracelet of the class described, overlapping hollow wings having the walls on the inside of the overlapping ends formed with enlarged holes, in combination with a coiled spring filling said holes and extending into the hollow wings and a pin passing through the wings and the axis of the spring coil, substantially as described.

2. The wings of a bracelet of the class described, having their ends overlap, and having the walls on the inside of the overlapping ends formed with enlarged holes, in combination with a spring-coil extending through said holes into the interior of the wings, a pin passing through the wings and the spring, and the arms or branches forming stops for the wings, substantially as described.

3. In combination with the overlapping wings, and with the spring-coil extending into the wings, the interposed ring placed on the spring-coil and the pivoting-pin, all substantially as described.

4. In combination with the overlapping wings, and with the spring-coil extending into the wings, the pin passing through the wing-walls and the spring, the hollow bosses on the outside of the walls, and the hollow cups on the pin, all substantially as described.

In testimony whereof I have signed my name to this specification in the presence of two subscribing witnesses.

THERON I. SMITH.

Witnesses:
L. I. MATHEWSON,
FRED. B. BYRAM.